United States Patent
Hettiarachchy et al.

(10) Patent No.: US 9,220,286 B2
(45) Date of Patent: Dec. 29, 2015

(54) FROZEN DESSERT COMPOSITIONS AND METHODS OF PREPARATION THEREOF

(71) Applicant: Board of Trustees of the University of Arkansas, Little Rock, AR (US)

(72) Inventors: Navam Hettiarachchy, Fayetteville, AR (US); Pengyin Chen, Fayetteville, AR (US)

(73) Assignee: Board of Trustees of The University of Arkansas, Little Rock, AR (US)

( * ) Notice: Subject to any disclaimer, the term of this patent is extended or adjusted under 35 U.S.C. 154(b) by 0 days.

(21) Appl. No.: 13/692,586

(22) Filed: Dec. 3, 2012

(65) Prior Publication Data

US 2014/0154372 A1    Jun. 5, 2014

(51) Int. Cl.
*A23L 1/20*         (2006.01)
*A23G 9/42*         (2006.01)
(Continued)

(52) U.S. Cl.
CPC . *A23G 9/42* (2013.01); *A23L 1/272* (2013.01); *A23G 9/04* (2013.01)

(58) Field of Classification Search
CPC .......... A23G 9/00; A23G 9/04; A23G 9/045; A23G 9/08; A23G 9/32; A23G 9/38; A23G 9/42; A23G 9/46; A23G 9/042; A23L 1/2005; A23L 1/2128; A23L 1/366; A23L 1/38; A23L 1/20; A23L 1/2001; A23L 1/2003; A23L 1/2006; A23L 1/2008; A23L 1/201; A23L 1/212; A23L 1/01; A23L 1/0121; A23L 1/03; A23L 1/27; A23L 1/272; A23L 1/2751; A23L 1/30; A23L 1/3002; A23L 1/304; A23B 7/00; A23B 7/005; A23B 7/06; A23B 7/14; A23B 7/157; A23B 9/00; A23B 9/02; A23B 9/16; A23B 9/24; A23B 9/30
USPC ......... 426/100, 101, 102, 103, 564, 565, 566, 426/567, 524, 515, 589, 598, 599, 629, 634, 426/519; 416/100, 629, 634
See application file for complete search history.

(56) References Cited

U.S. PATENT DOCUMENTS 2,299,080 A * 10/1942 De Back .................... 426/509
4,407,840 A * 10/1983 Lathrop et al. ............. 426/629
(Continued)

FOREIGN PATENT DOCUMENTS

CN    101401612 A    4/2009
CN    102550981 A    7/2012
(Continued)

OTHER PUBLICATIONS

"Epicurious" ("Edamame Ice Cream"), pub. Sep. 2007. http://www.epicurious.com/recipes/food/views/Edamame-Ice-Cream-239810.*
(Continued)

*Primary Examiner* — Jyoti Chawla
(74) *Attorney, Agent, or Firm* — Head, Johnson & Kachigian, P.C.

(57) ABSTRACT

The invention relates to frozen dessert compositions and methods of preparation thereof. In particular, the invention is relates to a method for preparing a frozen dessert composition, such as ice cream, fortified with vegetables and/or fruits and soybeans, such as edamame or dried mature soybeans and the resulting enriched frozen dessert compositions having a fine texture, good and creamy mouth-feel and tastes with different flavors.

23 Claims, 1 Drawing Sheet

(51) Int. Cl.
*A23L 1/272* (2006.01)
*A23G 9/04* (2006.01)

(56) References Cited

U.S. PATENT DOCUMENTS

| | | | |
|---|---|---|---|
| 4,473,591 A * | 9/1984 | Segner et al. | 426/270 |
| 4,840,808 A * | 6/1989 | Lee et al. | 426/270 |
| 4,855,156 A | 8/1989 | Singer et al. | |
| 6,497,913 B1 | 12/2002 | Gray et al. | |
| 2004/0028796 A1* | 2/2004 | Shemer | 426/615 |
| 2004/0213886 A1* | 10/2004 | Toves | 426/629 |
| 2008/0020114 A1 | 1/2008 | Umeda et al. | |
| 2008/0175972 A1* | 7/2008 | Cox et al. | 426/565 |
| 2008/0233266 A1* | 9/2008 | Boerboom | 426/637 |
| 2009/0110783 A1 | 4/2009 | Chung | |
| 2011/0136745 A1 | 6/2011 | Bringe et al. | |
| 2011/0256293 A1* | 10/2011 | Palta et al. | 426/550 |

FOREIGN PATENT DOCUMENTS

| | | |
|---|---|---|
| KR | 20080000223 A | 1/2008 |
| KR | 20080051052 A | 6/2008 |
| KR | 101154015 B1 | 6/2012 |

OTHER PUBLICATIONS

Branson ("Digital Sonifier® Models 250 & 450 User's Manual"), pub. 1998. http://pdfs.wolflabs.co.uk/service/Branson%20_Sonicators_-_Probe_Type_Digital_Sonifiers_250_and_450-manual.pdf.*

"Practical Action" ("Ice Cream Production", Technical Brief, Peter Fellows), pub. Sep. 2008. http://www.cd3wd.com/cd3wd_40/cd3wd/practact/ice_cream_production.pdf.*

Salama et al. ("Relationship Between Colour Improvement and Metallo-Chlorophyll Complexes During Blanching of Peas and Broccoli"), Alex. J. Fd. Sci. & Technol., vol. 4, No. 2, p. 11-18, pub. 2007. http://www.arabianfoodsci.com/scifdi/Journal/Vol%20_%2004%20_%2002%20_%20%202007/Relationship_Between_Colour_Improvement_and_Metallo_Chlorophyll.pdf.*

"Cookography" ("Handmade Vanilla Ice Cream"), pub. Jun. 7, 2009. http://www.cookography.com/2009/handmade-vanilla-ice-cream.*

Gruber ("Eat You Greens: Jessica Seinfeld's Green Veggie-Packed Recipes for Kids"), pub. Mar. 16, 2011. http://www.lilsugar.com/Jessica-Seinfeld-Spinach-Packed-Ice-Cream-Recipe-14940677.*

Ainslie ("The Secret to Successful Breakfast"), pub. Feb. 8, 2011. http://www.everyoneisvegan.com/2011/02/secret-to-successful-breakfast.html.*

"About" ("Benefits of Spinach"), pub. Mar. 16, 2011. http://web.archive.org/web/20110316220528/http://diabetes.about.com/od/dieticiansadvice/a/Benefits_of_Spinach.htm.*

"Jewish Humor Central" ("Ice Cream Flavors: Are You Ready for Lox, Hummus, Ruggelach, Charoset?"), pub. Oct. 3, 2010. http://www.jewishhumorcentral.com/2010/10/ice-cream-flavors-are-you-ready-for-lox.html.*

Ice cream related to soy Friedeck, K. G. Aragul-Yuceer, Y. K, Drake M. A. 2003. Soy Protein Fortification ofa Low-fat Dairy-based Ice Cream Journal of Food Science 68, 9:2651-2657.

Adlercreutz, H., Mousavi , Y., Clark, K. , Hockerstedt, K., Hamalainen, E., Wahala, T., Makela, T. , and Hase, T. 1992. Dietary phytoestrogens and cancer: In-Vitro and In-Vivo studies. J. Steroid Biochem. Mol. Biol. 41 : 331-337.

Barnes: S., and Messina, M. 1991. The role of soy products in reducing cancer risk. J. Natl. Cancer Inst. 83: 541-546.

Fotsis, T., Schweigerer, L, Pepper, M., Montesano, R., Adlercreutztapio, H., and Hase, T. 1995. Anticancer effects of genistein—genistein a dietary ingested isoflavonoid, inhibits cell proliferation and in-vitro angiogenesis J. Nutr. 125: 7908-7978.

Riaz, Mian, Soy Applications in Food, 2006.

Tofutti & Other Soy Ice Creams: The Non-Dairy Frozen Dessert Industry and . . . , William Shurtleff, Akiko Aoyagi—Google Books.

* cited by examiner

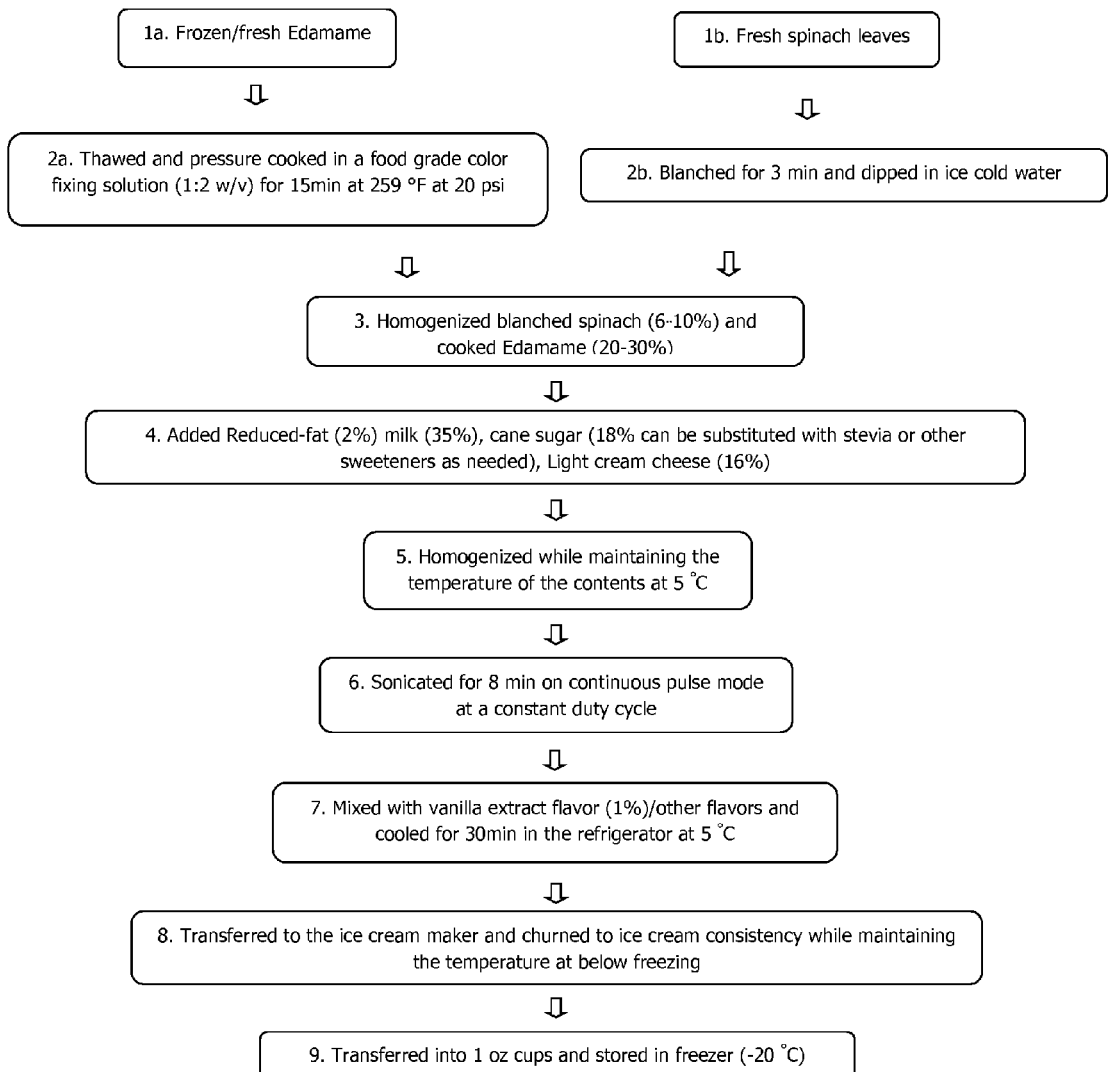

FROZEN DESSERT COMPOSITIONS AND METHODS OF PREPARATION THEREOF

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates generally to frozen dessert compositions and methods of preparation thereof, and more particularly to a method for preparing a frozen dessert composition, such as ice cream, fortified with vegetables and/or fruits and soybeans, such as dried mature soybeans or edamame, and the resulting soybean-enriched frozen dessert compositions having a fine texture, good and creamy mouth feel and tastes with different flavors.

2. Description of the Related Art

Ice cream is a product that is consumed by all age groups, but is traditionally perceived as an unhealthy snack. About 1.53 billion gallons of ice cream and related frozen desserts were produced in the U.S. in 2011 (USDA, National Agriculture Statistics Service). Ice cream sales generated total revenue of $10 billion in 2010 with take-home ice cream sales representing the largest section of the market, generating revenues of $6.8 billion or 67.7 percent of the market's overall value (MarketLine, an Informa business 2011).

Increasing health awareness has led to the demand for food with reduced calories. The green color in a product is perceived as fresh by a consumer. Taste and flavor of products are the major factors that drive the consumer for making food choices. Edamame is considered to be a natural produce with health benefits and foods prepared from such sources are in demand by the consumer. Edamame ice cream at a serving size of 72 g has total calories of 95, without sacrificing the taste in comparison to a conventional vanilla ice cream at the serving size of 72 g that has total calories of 145. In addition, consumers are increasingly focused on increased fiber content with taste. Edamame ice cream at the serving size of 72 g has double dietary fiber 1.0 g (4% daily value), compared to vanilla ice cream of the same serving size (dietary fiber 0.5 g, 2% daily value).

It is therefore desirable to provide frozen dessert compositions and methods of preparation thereof that incorporate vegetables and/or fruits in order to increase servings for consumers.

It is further desirable to provide methods of preparing frozen dessert compositions that are fortified with soybeans and vegetable-based produce and/or fruit while retaining the green lush color.

It is still further desirable to provide a method of preparing edamame ice cream using homogenization followed by sonication of the ice cream base to confer excellent mouth-feel, texture and stability.

It is also desirable to provide a method of preparing edamame ice cream that prevents the formation of ice crystals during freeze-thaw cycle.

It is yet further desirable to provide frozen dessert compositions and methods of preparation thereof with edamame as a major component and that compares well or superior to other commercial ice cream eating quality attributes.

It is still yet further desirable to provide frozen dessert compositions and methods of preparation thereof that increase the dietary fiber content, maintain the green lush color, and with isoflavones that have various health benefits.

It is yet further desirable to provide a frozen dessert composition that is low in saturated fat and low calories.

BRIEF SUMMARY OF THE INVENTION

In general, in a first aspect, the invention relates to a method for manufacturing a frozen dessert composition. The method includes the steps of preparing a soybean in a food grade color fixing solution; homogenizing the prepared soybean into a fine emulsion; homogenizing the emulsion with a dessert ingredient to form a dessert base; sonicating the dessert base; and preparing the frozen dessert composition from the sonicated dessert base. The soybean, such as dried matured soybeans or edamame, can be soaked overnight or cooked in a pressure cooker for about 15 minutes at a temperature of about 126° C. and at a pressure of about 20 psi, with a soybean-to-food grade color fixing solution ratio at 1:2 w/v. The food grade color fixing solution includes at least one food grade salt, such as a magnesium salt, a zinc salt, a calcium salt or a combination thereof, and more particularly 0.5% magnesium chloride, 0.5% zinc acetate and 0.5% calcium lactate 5-hydrate.

In addition to the soybean, a vegetable and/or fruit can be included in the frozen dessert composition. To incorporate the vegetable and/or fruit for additional nutrient value and/or color, a blanched or unblanched vegetable and/or a fruit may be can be homogenized with the prepared soybean into the fine emulsion. Further, the dessert ingredient can include milk, sweetener and/or light cream cheese to provide a fine texture, good and creamy mouth-feel and tastes with different flavors. The dessert base may be homogenized at a temperature of about 5° C., and then sonicated for about 8 minutes on a continuous pulse mode at a constant duty cycle. At this point, the dessert base can be flavored and churned while maintaining a temperature below freezing to form the frozen dessert composition.

In general, in a second aspect, the invention relates to a method for preparing an edamame-fortified ice cream. The method includes homogenizing edamame cooked or soaked overnight (for approximately 12 hours) in a food grade color fixing solution; preparing an edamame ice cream base with milk, sugar and light cream cheese as needed; sonicating the edamame ice cream base; and adding flavor to prepare the edamame ice cream from the edamame ice cream base. The method can further include cooking the edamame in the food grade color fixing solution at 1:2 w/v for about 15 minutes at a temperature of about 126° C. and at a pressure of about 20 psi; then homogenizing the prepared edamame to form the emulsion; then homogenizing the edamame with milk, sugar, light cream cheese as needed and flavors at a cooling temperature; then sonicating the edamame ice cream base for about 8 minutes on a continuous pulse mode at a constant duty cycle; and lastly preparing the edamame ice cream from the flavored edamame ice cream base. Moreover, the method may include cooking the edamame in the food grade color fixing solution at 1:2 w/v for about 15 minutes at a temperature of about 126° C. and at a pressure of about 20 psi; either concurrently or separately, blanching a vegetable and/or fruit with or without a color fixing solution; then homogenizing the blanched vegetable and/or fruit and the prepared edamame to form the emulsion; adding an ice cream base to the emulsion with milk, sugar and cream cheese as needed to form the edamame ice cream base; homogenizing the edamame ice cream base at a cooling temperature; then sonicating the edamame ice cream base for about 8 minutes on a continuous pulse mode at a constant duty cycle; then adding at least one flavor to the edamame ice cream base; and then preparing the edamame ice cream from the flavored edamame ice cream base churning the edamame ice cream base while maintaining a below freezing temperature to form the edamame ice cream.

In general, in a third aspect, the invention relates to an edamame-fortified ice cream prepared by the method described above. The edamame-fortified ice cream can include about 20% to about 30% by weight prepared edamame; about 6% to about 10% by weight vegetable and/or fruit, such as green produce; about 35% by weight milk; about 18% sweetener; and about 16% by weight light cream cheese. In addition, the edamame-fortified ice cream can include an additive flavor, such as lemon, lime, banana, strawberry, pistachio, mint or chocolate.

BRIEF DESCRIPTION OF THE DRAWINGS

FIG. 1 is a flow diagram illustrating an example method of preparing a fortified frozen dessert composition in accordance with one aspect of the invention disclosed herein.

Other advantages and features of the invention will be apparent from the following description and from the claims.

DETAILED DESCRIPTION OF THE INVENTION

The compositions and methods discussed herein are merely illustrative of specific manners in which to make and use this invention and are not to be interpreted as limiting in scope.

While the compositions and methods have been described with a certain degree of particularity, it is to be noted that many variations and modifications may be made without departing from the spirit and scope of this disclosure. It is understood that the compositions and methods are not limited to the embodiments set forth herein for purposes of exemplification.

The invention relates generally to frozen dessert compositions and methods of preparation thereof. The invention is directed to a method for preparing a frozen dessert composition fortified with vegetables and/or fruits and soybeans, and the resulting soybean-enriched frozen dessert compositions. The frozen dessert compositions, such as ice cream, incorporate soybeans, such as dried mature soybeans or edamame, as a main ingredient to give taste without beany flavor, color, body and all other attributes of a healthy ice cream composition. The fresh green color of edamame is enriched with the other green vegetables and/or fruits. The method disrupts the soybean matrix by homogenization followed with sonication. Liposomes formed during sonication provide particles with a fine texture, stabilize against a density gradient, and prevent the formation of ice crystals (by having a micro-emulsion with high surface area) on storage.

As illustrated in FIG. 1, the method involves preparing ice cream by respectively cooking edamame for a predetermined amount of time and at a predetermined temperature The fixing solution includes at least one of three salts or a combination thereof, such as a magnesium salt, namely magnesium chloride, a zinc salt, namely zinc acetate, and a calcium salt, namely calcium lactate 5-hydrate, which can also be a source of mineral nutrients for the human body. The prepared edamame and blanched or unblanched vegetables and/or unblanched fruits can then homogenized to form a fine emulsion. Suitable ice cream constituents (e.g., milk, sugar and light cream cheese) are then added and homogenized with the fine emulsion to form an ice cream mixture. The ice cream mixture is then sonicated for a predetermined amount of time, after which various flavorings (e.g., vanilla extract, lemon, lime, banana, strawberry, pistachio, mint, chocolate chips or other flavors or a combination thereof) can be mixed with the sonicated ice cream mixture. After cooling for a sufficient amount of time (e.g., for 30 minutes at 5° C.), the flavored ice cream mixture can then be transferred to an ice cream maker and churned to a suitable consistency while maintaining a temperature at below freezing. Once the resulting ice cream is formed, it can be divided and/or stored in a freezer.

The invention disclosed herein is further illustrated by the following example, which is provided for the purpose of demonstration rather than limitation.

EXAMPLE

Frozen edamame was thawed and pressure cooked in a food grade coloring fixing solution (1:2 w/v) for 15 minutes at a temperature of 126° C. and a pressure of 20 psi. In addition to enhance the green lush color of the ice cream, spinach leaves were blanched in a food grade color fixing solution for 3 minutes and then shocked in ice cold water. The food grade color fixing solution consisted of 0.5% magnesium chloride, 0.5% zinc acetate and 0.5% calcium lactate 5-hydrate. The blanched spinach (between about 6-10% by weight) and prepared edamame (between about 20-30% by weight) are then homogenized with a magic bullet until the edamame forms a fine emulsion. The ice cream constituents, namely reduced-fat (2%) milk (about 35% by weight), cane sugar (about 18% by weight, which can be substituted with a suitable artificial sweetener) and light cream cheese (about 16% by weight), were added and then homogenized with the fine edamame emulsion while maintaining the temperature constants at 5° C. The ice cream mixture was then sonicated for 8 minutes on a continuous pulse mode at a constant duty cycle.

After sonication, vanilla extract (about 1% by weight) flavor was mixed in and the flavored ice cream mixture was cooled for 30 minutes in the refrigerator at 5° C. Once cooled, the flavored ice cream mixture was transferred to an ice cream maker and churned while maintaining a temperature below freezing. Once a suitable ice cream consistency was reached, the ice cream was transferred into 1 ounce cups and stored in a freezer at −20° C. Subsequently, the procedure was replicated to create other edamame-flavored ice creams from a creamy emulsion without a gritty texture. In particular, the following flavors were developed: spinach and vanilla; lemon and lime, mint and chocolate chips, banana and strawberry, and pistachio (or nuts).

Whereas, the compositions and methods have been described in relation to the drawings and claims, it should be understood that other and further modifications, apart from those shown or suggested herein, may be made within the spirit and scope of this invention.

What is claimed is:

1. A method for manufacturing a frozen dessert composition having superior shelf-life stability and said green color retention properties, said method comprising the steps of:
   a. preparing an edamame soybean in a first food grade color fixing solution, said first food grade color fixing solution containing a combination of 0.5% magnesium chloride, 0.5% zinc acetate, and 0.5% calcium lactate 5-hydrate;
   b. preparing a leafy vegetable in a second food grade color fixing solution containing a combination of 0.5% magnesium chloride, 0.5% zinc acetate, and 0.5% calcium lactate 5-hydrate, and wherein said leafy vegetable is prepared separately from said edamame soybean, and wherein said first food grade color fixing solution and said second food grade color fixing solution provide superior shelf-life stability and green color retention properties of said frozen dessert composition;

c. combining and homogenizing said prepared edamame soybean and said prepared leafy vegetable into a fine emulsion;

d. homogenizing said fine emulsion with a dessert ingredient to form a dessert base;

e. sonicating said dessert base; and f. preparing said frozen dessert composition from said sonicated dessert base.

2. The method of claim 1 wherein said step of preparing said edamame soybean further comprises the step of cooking said edamame soybean in said first food grade color fixing solution or soaking said edamame soybean in said first food grade color fixing solution for a predetermined amount of time.

3. The method of claim 2 wherein said step of cooking said edamame soybean further comprises the step of cooking said edamame soybean for about 15 minutes at a temperature of about 126° C. and at a pressure of about 20 psi in said first food grade color fixing solution.

4. The method of claim 1 wherein said step of preparing said edamame soybean further comprises the step of cooking said edamame soybean in said first food grade color fixing solution at 1:2 w/v.

5. The method of claim 1 further comprising the step of homogenizing said prepared edamame soybean, said prepared vegetable and an unblanched fruit into said fine emulsion.

6. The method of claim 1 wherein step d. further comprises the steps of:
a. adding said dessert ingredient to said fine emulsion to form said dessert base; and
b. homogenizing said dessert base while maintaining a temperature of about 5° C.

7. The method of claim 1 wherein said step of sonicating said dessert base further comprises the step of sonicating said dessert base for about 8 minutes on a continuous pulse mode at a constant duty cycle.

8. The method of claim 1 further comprising the steps of:
a. flavoring said sonicated dessert base;
b. cooling said flavored, sonicated dessert base for about 30 minutes; and
c. preparing said frozen dessert composition from said flavored, sonicated dessert base.

9. The method of claim 8 wherein said step of preparing said frozen dessert composition further comprises the step of churning said flavored, sonicated dessert base while maintaining a temperature below freezing to form said frozen dessert composition.

10. The method of claim 1 wherein said first food grade color fixing solution consists essentially of 0.5% magnesium chloride, 0.5% zinc acetate, and 0.5% calcium lactate 5-hydrate, and wherein said second food grade color fixing solution consists essentially of 0.5% magnesium chloride, 0.5% zinc acetate, 0.5% calcium lactate 5-hydrate.

11. The method of claim 1 wherein said frozen dessert composition is ice cream.

12. The method of claim 1 wherein said leafy vegetable is spinach.

13. A method for preparing an edamame-fortified ice cream having superior shelf-life stability and green color retention properties, said method comprising the steps of:
a. cooking edamame soybean in a food grade color fixing solution for about 15 minutes at a temperature of about 126° C. and at a pressure of about 20 psi, said food grade color fixing solution containing a combination of 0.5% magnesium salt, 0.5% zinc salt, and 0.5% calcium salt, said food grade color fixing solution providing said superior shelf-life stability and green color retention properties to said edamame-fortified ice cream;

b. subsequent to step a., homogenizing a blanched or unblanched green vegetable and said cooked edamame soybean to form a fine emulsion;

c. adding a dessert constituent to said fine emulsion to form an edamame ice cream base;

d. homogenizing said edamame ice cream base at a cooling temperature of about 5° C.;

e. subsequent to step d., sonicating said edamame ice cream base for about 8 minutes on a continuous pulse mode at a constant duty cycle; and f. preparing said edamame ice cream from said sonicated edamame ice cream base.

14. The method of claim 13 wherein said step a. further comprises cooking said edamame in said food grade color fixing solution at 1:2 w/v.

15. The method of claim 13 said step f. of preparing said edamame ice cream further comprising the steps of:
a. adding at least one flavor to said edamame ice cream base to form a flavored edamame ice cream base;
b. cooling said flavored edamame ice cream base for a predetermined amount of time; and
c. preparing said edamame ice cream from said flavored edamame ice cream base.

16. The method of claim 15 wherein said step f. of preparing said edamame ice cream further comprises the step of churning said flavored edamame ice cream base while maintaining a below freezing temperature to form said edamame ice cream.

17. The method of claim 15 wherein said flavor is selected from the group consisting of lemon, lime, banana, strawberry, pistachio, mint, vanilla or chocolate.

18. The method of claim 13 wherein said food grade color fixing solution consists essentially of a combination of 0.5% magnesium chloride, 0.5% zinc acetate, and 0.5% calcium lactate 5-hydrate.

19. The method of claim 13 wherein said green vegetable is spinach.

20. The method of claim 13 wherein said step b. further comprises homogenizing said green vegetable and an unblanched fruit and said prepared cooked edamame to form said fine emulsion.

21. The method of claim 13 further comprising the steps of:
preparing said green vegetable in said food grade color fixing solution separately from said edamame soybean; and
combining said green vegetable and said cooked edamame soybean and homogenizing to form said fine emulsion.

22. A method for preparing a frozen dessert composition having superior shelf-life stability and green color retention properties, said method comprising the steps of:
a. cooking edamame soybean in a food grade color fixing solution at 1:2 w/v for about 15 minutes at a temperature of about 126° C. and at a pressure of about 20 psi, said food grade color fixing solution containing a divalent cation salt consisting essentially of 0.5% magnesium chloride, 0.5% zinc acetate and 0.5% calcium lactate 5-hydrate, said food grade color fixing solution providing superior shelf-life stability and green color retention properties to said frozen dessert composition;

b. homogenizing a blanched or unblanched green vegetable and an unblanched fruit and said cooked edamame soybean to form a fine emulsion;

c. adding a dessert constituent to said fine emulsion to form an edamame dessert base;

d. homogenizing said edamame dessert base at a cooling temperature of about 5° C.;

e. subsequent to step d., sonicating said edamame dessert base for about 8 minutes on a continuous pulse mode at a constant duty cycle;

f. adding at least one flavor to said edamame dessert base to form a flavored edamame ice cream base;

g. cooling said flavored edamame dessert base for a predetermined amount of time; and h. preparing said edamame dessert from said flavored edamame dessert base.

23. The method of claim 22 further comprising the steps of:
preparing a green vegetable separately from said edamame soybean using said food grade color fixing solution; and
combining and homogenizing said prepared green vegetable and said unblanched fruit and said cooked edamame soybean to form said fine emulsion.

* * * * *